(12) United States Patent
Wesselak

(10) Patent No.: US 6,584,846 B2
(45) Date of Patent: Jul. 1, 2003

(54) MAGNETIC MOTION SENSOR

(75) Inventor: Viktor Wesselak, Spardorf (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 09/848,686

(22) Filed: May 3, 2001

(65) Prior Publication Data

US 2002/0070728 A1 Jun. 13, 2002

(30) Foreign Application Priority Data

Sep. 28, 2000 (DE) .......................................... 100 48 172

(51) Int. Cl.⁷ .............................................. G01P 15/08
(52) U.S. Cl. .............................. 73/514.31; 324/207.24; 324/207.25
(58) Field of Search ...................... 73/514.31, 514.33, 73/514.39; 324/207.14, 207.15, 207.21, 207.24, 207.25

(56) References Cited

FOREIGN PATENT DOCUMENTS

| DE | 1490684 | 10/1964 |
| DE | 3639208 | 11/1986 |
| DE | 3732958 | 9/1987 |
| EP | WO0028282 | 5/2000 |

OTHER PUBLICATIONS

Hans–Jürgen Gevatter (Hrsg.), "Handbuch der Mess– und Automatisierungstechnik", Springer–Verlag, 1999, pp107, 115.

Primary Examiner—Richard A. Moller
(74) Attorney, Agent, or Firm—Baker Botts LLP

(57) ABSTRACT

A magnetic motion sensor, having a mobile magnet that generates an essentially homogeneous magnetic field with a magnetic-field direction, and having a coupling element which is stationary within the magnetic field, and wherein a motion-dependent physical quantity is induced in the coupling element when the magnet moves perpendicular to the magnetic-field direction, and the induced quantity is measured and output by a sampling element.

13 Claims, 2 Drawing Sheets

MAGNETIC MOTION SENSOR

The present invention relates to a magnetic motion sensor, having a magnet that generates an essentially homogeneous magnetic field with a magnetic-field direction, and having a coupling element which is arranged inside the magnetic field.

BACKGROUND OF THE INVENTION

Magnetic motion sensors are widely known and used to measure a motion-dependent physical quantity. In this context, the term motion-dependent physical quantity is intended to mean a physical quantity which, unlike a position-dependent physical quantity, depends on the motion per se.

Motion sensors known in the prior art, utilize a stationary magnet and a mobile coupling element. When the coupling element moves perpendicular to the magnetic-field direction, a motion-dependent physical quantity is induced in the coupling element. The induced quantity is measured and output by a sampling element. Magnetic motion sensors of this type are described, for example, in Gevatter: "Handbuch der Messund Automatisierungstechnik" [Handbook of measurement and automation technology], Springer-Verlag, 1999, pages 107f and 115. Ferraris sensors are also constructed in this way.

Due to the motion of the coupling element, only contactless sampling of the motion-dependent physical quantity is possible when using the known magnetic motion sensors. Accordingly, these sensors need to be adjusted precisely. For this reason, they are complicated, susceptible to interference and comparatively expensive.

SUMMARY OF THE INVENTION

It is an object of the present invention to provide a simply constructed motion sensor which is robust and not susceptible to interference. This object is achieved by utilizing a mobile magnet and a stationary coupling element. The advantage that is realized by this construction is that the sampling element can then be directly connected mechanically to the coupling element and contactless sampling of the coupling element is not necessary. Nevertheless, even contactless sampling of the coupling element is simplified, because the coupling element is stationary and, no shaking, for example, of the coupling element can occur.

The motion of the magnet may be translational or rotational, according to the desired requirements. The motion-dependent physical quantity may be a force or moment, or a current; and further, the motion-dependent physical quantity may be proportional to velocity or acceleration, according to desired requirements.

The structural design of the magnetic motion sensor of the present invention can be made particularly simple by the following measures:

the magnet is designed as a permanent magnet;

the coupling element is designed as a solid body; and the coupling element is designed as an electrically conductive element.

DRAWINGS

Further advantages and details are apparent from the following description of an exemplary embodiment, for which the Figures schematically show the following:

DETAILED DESCRIPTION OF THE INVENTION

Figure 1:
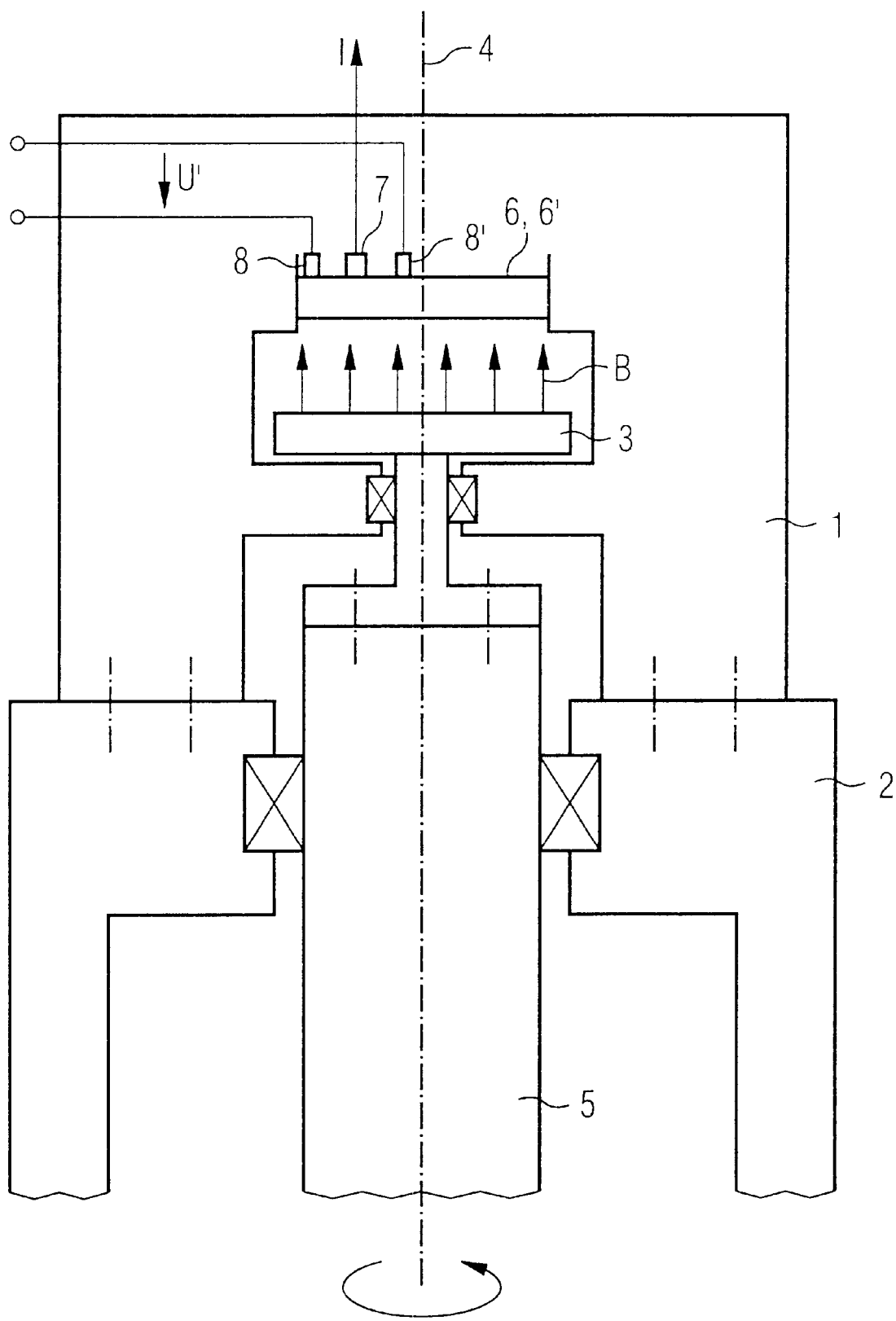
FIG. 1 is a side view of a magnetic motion sensor.

According to FIG. 1, a magnetic motion sensor has a sensor housing 1. The sensor housing 1 is firmly connected to a working-element housing 2. A permanent magnet 3 is mounted in the sensor housing 1. The permanent magnet 3 is in this case mounted in such a way that it can rotate about an axis of rotation 4. The permanent magnet 3 generates an essentially homogeneous magnetic field B, which extends parallel to the axis of rotation 4. The permanent magnet 3 is interlocked in rotation with a shaft 5 (alternatively an axle 5) of the working element whose rotational movement is to be measured.

A stationary coupling element 6, 6' is also arranged in the sensor housing 1. According to FIG. 1, the coupling element 6, 6' is shown arranged within the magnetic field B.

When the shaft (or axle 5) rotates, the permanent magnet 3 executes a rotational motion. The motion of the permanent magnet 3 is hence a rotational motion and, specifically, perpendicular to the magnetic-field direction. Consequently, a motion-dependent physical quantity is induced in the coupling element 6, 6'. This quantity is measured and output by sampling elements 7, 8, 8'.

Figure 2:
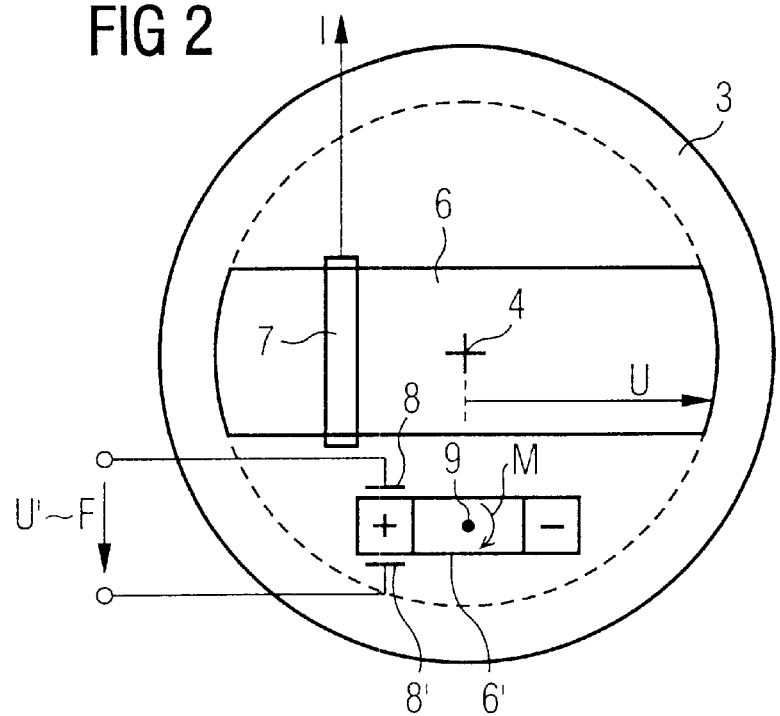
FIG. 2 is a plan view of the motion sensor in FIG. 1.

According to FIG. 2, the coupling element 6 may consist, for example, of a diamagnetic or paramagnetic metal. In this case, the coupling element 6 is designed as a solid body and as an electrically conductive element. The coupling element 6 may in this case be designed, according to the desired requirements, and as shown in FIG. 2 is a comparatively narrow metal strip arranged centrally with respect to the axis of rotation 4, or as a substantially or completely solid disk.

Owing to the motion of the permanent magnet 3, a force is exerted on the charge carriers of the coupling element 6, namely the Lorentz force. Displacement of the freely mobile electrons of the coupling element 6, which just compensates for the Lorentz force, consequently takes place between the axis of rotation 4 and the outer edge of the coupling element 6.

The Lorentz force is proportional to the velocity with which the permanent magnet 3 moves. The velocity of the permanent magnet 3 is in turn proportional to the angular velocity with which the permanent magnet 3, i.e. the shaft 5 or the axle 5, rotates. An opposing voltage U that builds up is hence also proportional to the rotational velocity of the permanent magnet 3. If the permanent magnet 3 is accelerated, then its velocity changes and the opposing voltage U that builds up also changes. This induces a compensating current I in the coupling element 6 because of the charge-carrier displacement that results. The compensating current I is proportional to the rotational acceleration of the permanent magnet 3. It can be measured, or tapped, using the sampling element 7, e.g. a magnetoresistive sensor 7.

Further, as an alternative or in addition, it is also possible to arrange an electric dipole 6', off-center with respect to the axis of rotation 4, as the coupling element 6'. In this case as well, a force F is exerted on the charge carriers of the dipole 6' as a result of the rotational motion of the permanent magnet 3. This force F can be measured directly via piezoelectric elements 8, 8' and converted into a piezoelectric voltage U'. As an alternative to measuring the force F, it is also possible to measure a moment M about a dipole axis 9. The piezoelectric elements 8, 8', which in this case represent the sampling elements 8, 8', are likewise directly connected mechanically to the coupling element 6'.

Figure 3:
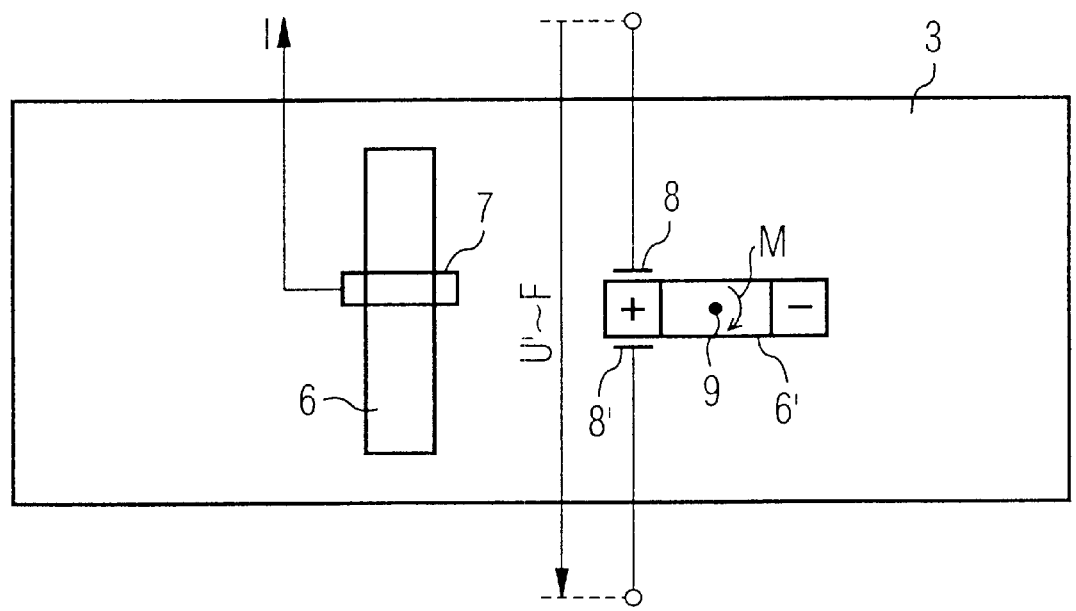
FIG. 3 is a plan view of another embodiment of the motion sensor.

The structure of a magnetic motion sensor for measuring a rotational motion of the permanent magnet 3 has been described above in conjunction with FIGS. 1 and 2. The arrangement according to FIGS. 1 and 2 can also, however, be readily adapted for a translational motion. An arrangement of this type is diagrammatically represented in FIG. 3. Those elements which are the same are in this case denoted by the same reference numbers. In adapting the present invention for measuring a translational motion, it is merely necessary to take care that the permanent magnet 3 is large enough to measure the full movement range to be traveled in translation.

What is claimed is:

1. A magnetic motion sensor, comprising a mobile magnet that generates an essentially homogeneous magnetic field with a magnetic-field direction, and a coupling element which is stationary within the magnetic field, wherein a motion-dependent physical quantity is induced in the coupling element when the magnet moves perpendicular to the magnetic-field direction.

2. The motion sensor according to claim 1, wherein the motion of the magnet is a translational motion.

3. The motion sensor according to claim 1, wherein the motion of the magnet is a rotational motion.

4. The motion sensor according to claim 1, wherein the motion-dependent physical quantity is a force.

5. The motion sensor according to claim 1, wherein motion-dependent physical quantity is a current.

6. The motion sensor according to claim 1, wherein the motion-dependent physical quantity is proportional to velocity.

7. The motion sensor according to claim 1, wherein the motion-dependent physical quantity is proportional to acceleration.

8. The motion sensor according to claim 1, wherein the magnet is designed as a permanent magnet.

9. The motion sensor according to claim 1, wherein the coupling element is a solid body.

10. The motion sensor according to claim 1, wherein the coupling element is designed as an electrically conductive element.

11. The motion sensor according to claim 2, wherein the sampling element is mechanically connected to the coupling element.

12. The motion sensor according to claim 1, further comprising a sampling element wherein the induced motion-dependent physical quantity is measured and outputted.

13. The motion sensor according to claim 1, wherein the motion-dependent physical quantity is a moment.

* * * * *